June 21, 1966  A. N. DEDRICKS ETAL  3,256,710
APPARATUS FOR MAKING FROZEN PRODUCT
Filed June 27, 1963  6 Sheets-Sheet 1
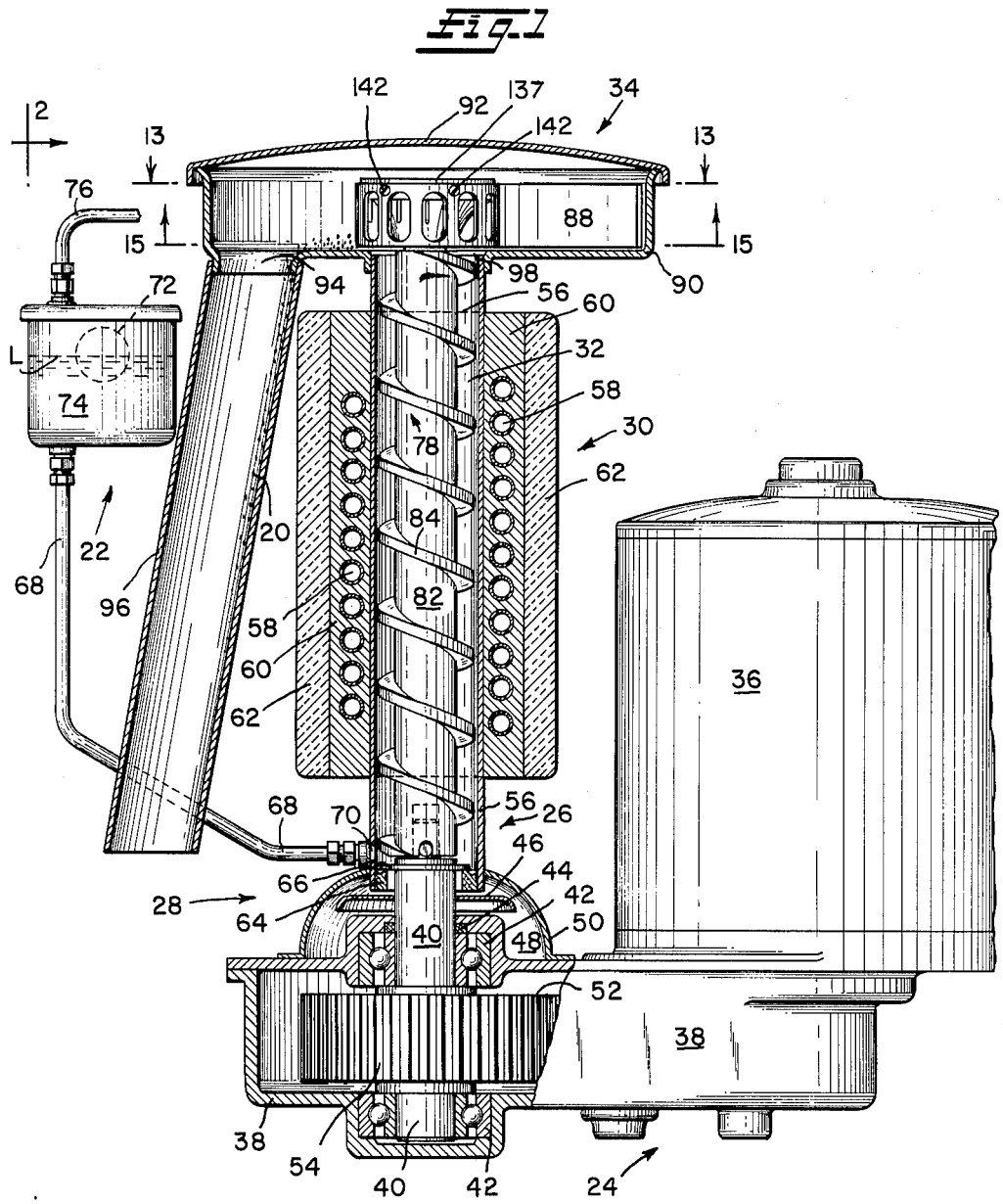
Fig.1
INVENTORS
Alvin N. Dedricks
Richard H. Swanson
BY 
ATTORNEY

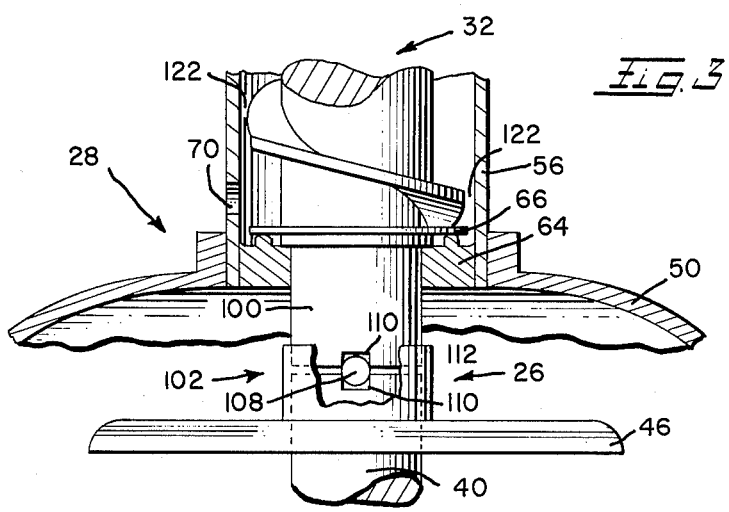
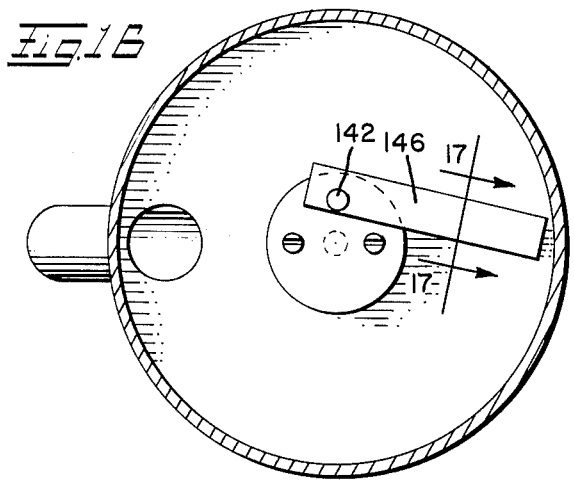
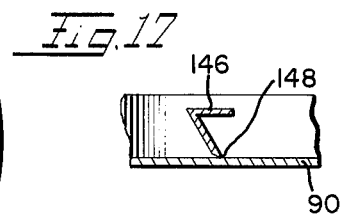

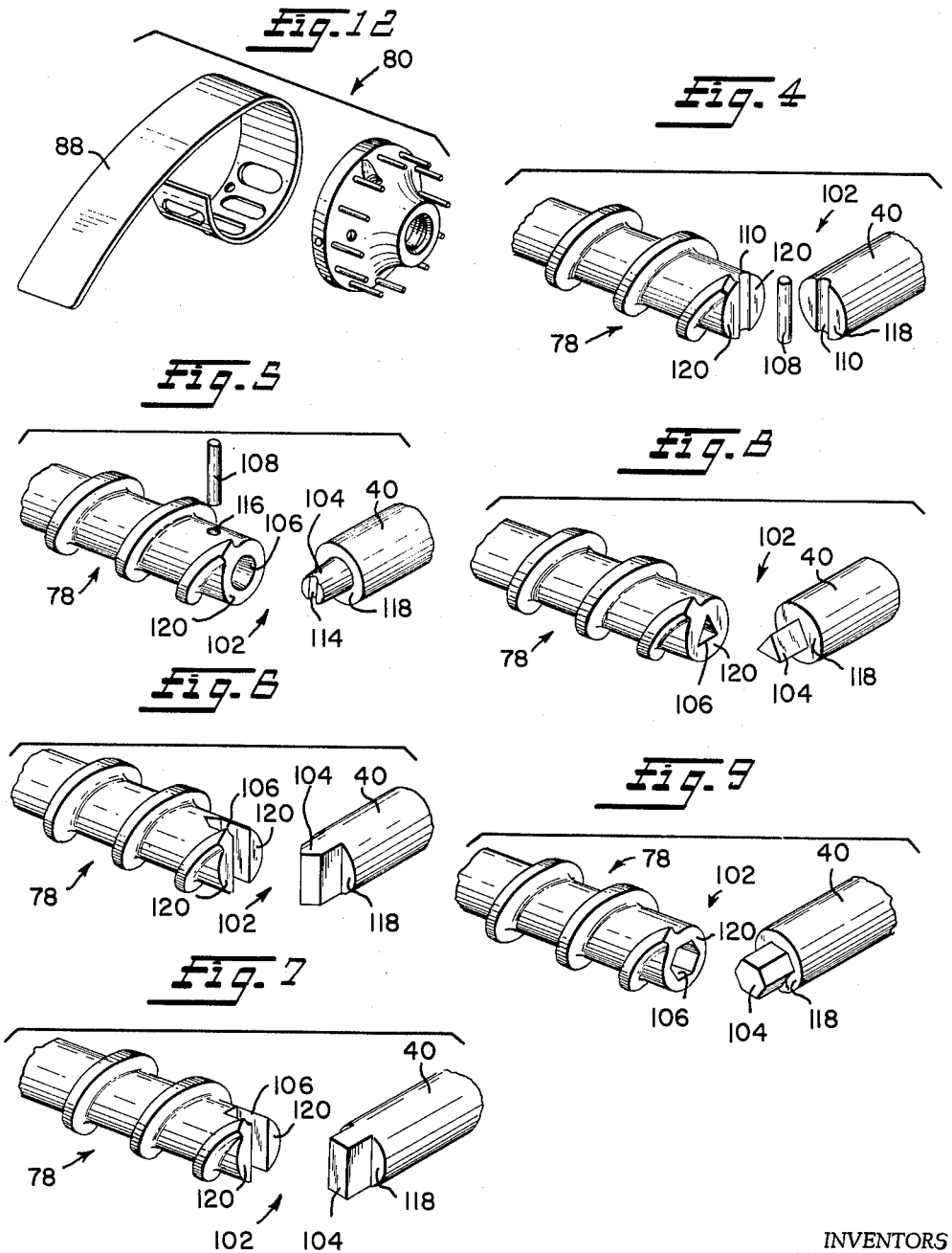

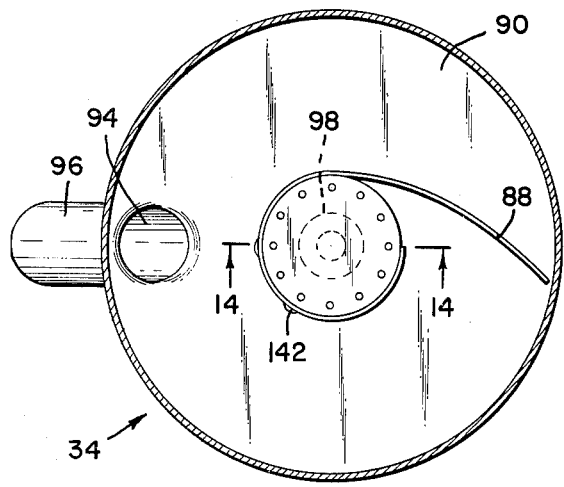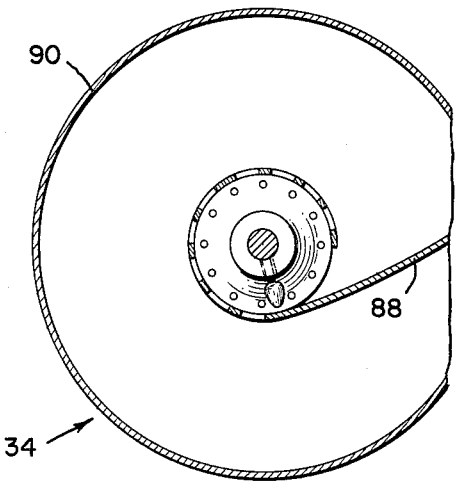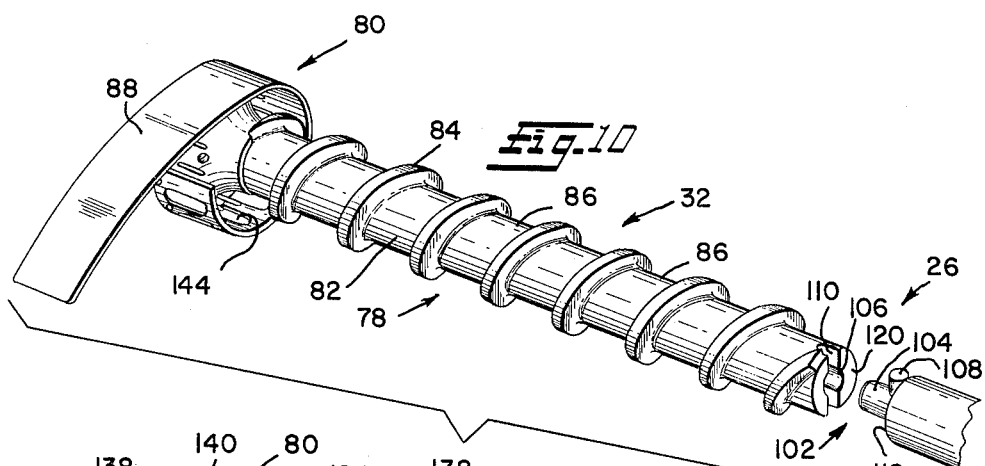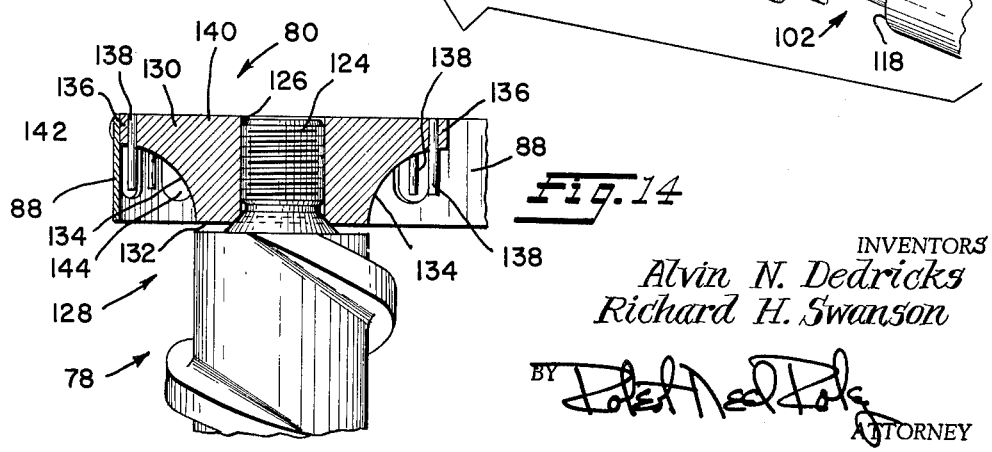

June 21, 1966 A. N. DEDRICKS ET AL 3,256,710
APPARATUS FOR MAKING FROZEN PRODUCT
Filed June 27, 1963 6 Sheets-Sheet 6
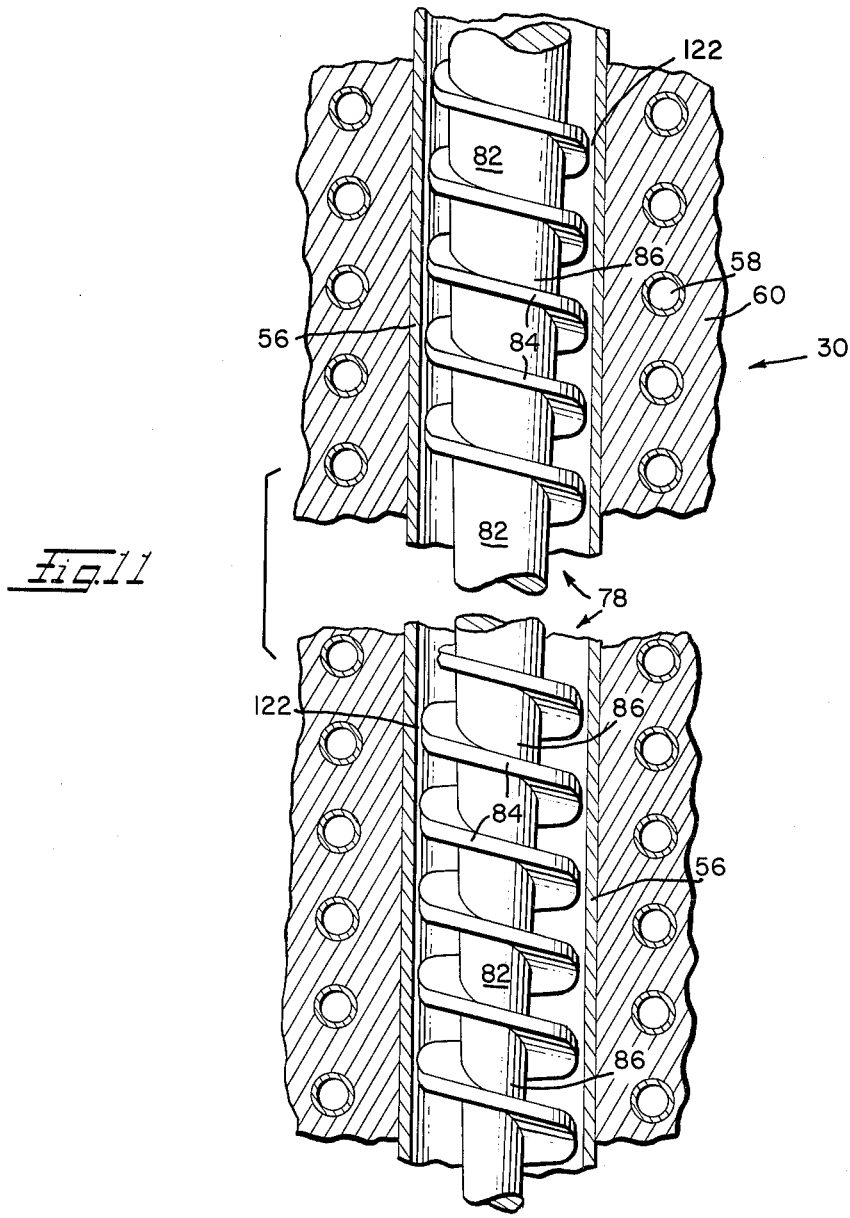
INVENTORS
Alvin N. Dedricks
Richard H. Swanson
BY
ATTORNEY

United States Patent Office 3,256,710
Patented June 21, 1966

3,256,710
APPARATUS FOR MAKING FROZEN PRODUCT
Alvin N. Dedricks and Richard H. Swanson, Manitowoc, Wis., assignors to The Manitowoc Company Inc., Manitowoc, Wis., a corporation of Wisconsin
Filed June 27, 1963, Ser. No. 291,101
20 Claims. (Cl. 62—320)

The present invention relates generally to machinery, mechanism, equipment or apparatus of a system employing a method or process for preparing frozen products and is more particularly concerned with the preparation of frozen foods.

There is currently being formulated, by the National Sanitation Foundation, standards of cleanliness relating to automatic frozen food product making machinery, mechanism, equipment or apparatus to which manufacturers must conform in order to obtain a seal of approval from the foundation. Included in these standards are definitions as to the meaning of the various requirements of which the following are given by way of example:

READILY ACCESSIBLE: Readily accessible shall mean exposed or easily exposed without the use of tools, for proper and thorough cleaning and visual inspection.

ACCESSIBLE: Accessible shall means readily exposed for proper and thorough cleaning and inspection with the use of only simple tools, such as a screw driver, pliers, or open-end wrench.

READILY (OR EASILY) REMOVABLE: Readily (or easily) removable shall means capable of being taken away from the main unit, without the use of tools.

REMOVABLE: Removable shall means capable of being taken away from the main unit with the use of only simply tools, such as a screw driver, pliers, or open-end wrench.

It is therefore a primary object of this invention to provide a system, method or process as well as a machine, mechanism, equipment or apparatus, for manufacturing a frozen food product from a liquid source such as pure, colored or flavored water, fruit juices or the like which will satisfy the requirements of the standards set by the National Sanitation Foundation.

It is another object of this invention to provide a frozen food product forming machine, mechanism, equipment or apparatus which employs a system, process or method for forming a frozen food product from a liquid source with the liquid source being continuously frozen, in a freezing zone, mechanically moved from the freezing zone, broken up into chips and delivered to a storage area for use by a consumer wherein the machine, equipment, mechanism and apparatus of the system which performs the process or method conforms to the standards of the National Sanitation Foundation.

It is yet another object of this invention to provide improved mechanism, equipment, apparatus and machinery in a system employing a novel method or process for freezing fluids from different liquid sources and continuously forming frozen particles or chips of varying highly desirable size.

It is also another object of this invention to provide machinery, mechanism, equipment and apparatus in a system employing a method or process for continuously freezing a liquid source wherein the liquid source, when frozen, forms a bearing surface for a rotating frozen-liquid conveyor arrangement of the system so that the conveyor arrangement will be disposed with a floating effect.

It is still another object of this invention to provide apparatus in a system employing a novel methods or process for continuously freezing and forming frozen particles or chips from a liquid source wherein the apparatus comprises a rotary plural part unit having a conveyor arrangement supported for rotation within the confines of a freezer by the frozen liquid source, and a particles chipper device is rotatably carried by the conveyor arrangement at a location thereon, which is exterior of the freezer, with the plural parts of the unit being removable from the apparatus of the system and separated into the component parts thereof by hand without requiring the use of tools of any kind.

It is an additional object of this invention to provide machinery, mechanism, equipment and apparatus in a system employing a method or process for freezing and forming particles or chips from a liquid food source wherein the apparatus comprises an auger type ice chipper unit rotatably supported with a floating effect for rotation within a freezer by the frozen food product formed adjacent thereto and which is easily, quickly and readily manually removable from the freezer and the apparatus and which is also adjustable by hand for forming particles or chips of different sizes.

It is still an additional object of this invention to provide machinery, mechanism, equipment and apparatus in a system employing a method or process for freezing and forming ice chips from a source of liquid water wherein the apparatus comprises a readily accessible and easily removable auger type ice chipper unit rotatably trunnioned within a freezer solely by the frozen ice and a collector rotatably secured to the unit to aid in the removal of the ice chips from the apparatus into a storage area.

It is also an object of this invention to provide apparatus for a system employing a method or process for freezing a liquid source into a frozen produce wherein the apparatus comprises an improved and novel drive connection which is readily and easily accessible and removable, yet efficiently operable to actuable, power or otherwise operate the respective components of the apparatus.

It is also an object of this invention to provide apparatus for a system employing a method or process for freezing a liquid source into a frozen product wherein the apparatus comprises improved and novel sealing mechanism which is readily and easily accessible and removable and is effective to seal the liquid being frozen from the other component parts of the apparatus.

It is also an object of this invention to provide apparatus for a system employing a method or process for freezing a liquid source into a frozen product wherein the apparatus comprises a novel and improved conveyor arrangement which is readily and easily accessible and removable which bear against only the frozen product and which further compress the frozen product to effectively remove any unfrozen liquid therefrom.

It is also an object of this invention to provide apparatus for a system employing a method or process for freezing a liquid source into a frozen product wherein the apparatus comprises a chipper-particle forming device which is readily and easily accessible and removable which effectively chips or otherwise breaks up the frozen product into relatively small particles, with such device also being capable of chipping or otherwise breaking up the frozen product into particles that may vary in size according to the needs of a consumer.

It is also an object of this invention to provide apparatus for a system employing a method or process for freezing a liquid source into a frozen product wherein the apparatus comprises a pivot or hinge arrangement which enables the apparatus as well as other associated machinery, mechanism, equipment or component parts of the system to be pivotably or hingeably mounted on a base in a first operable position wherein the system is operable to form the frozen product to a second position wherein the apparatus as well as the machinery, mechanism, equipment and other component parts are more readily and easily accessible and removable.

Other objects, advantages and important features of the invention will be apparent from a study of the specification following, taken with the drawing which together describe, disclose, illustrate and show certain embodiments or modifications of machinery, mechanism, equipment and apparatus which define the component parts of a system which employs a method or process of forming frozen products and what is now considered and believed to be the best method of practicing the procuredures and principles thereof. Still other embodiments, modifications, procedures or equivalents may be subject to those having the benefit of the teaching herein and such other embodiments, modifications, procedures or equivalents are intended to be reserved to the applicants especially as they fall within the scope and breadth of the subjoined claims.

In the drawing:

FIGURE 1 is a side elevational view, of machinery, mechanism, equipment and apparatus which forms the component parts of a system for forming frozen products of particle or chip size wherein certain portions thereof are broken away and illustrated in section to better show the details of drive machinery and drive connection, liquid sealing mechanism, freezing equipment, frozen product conveyor arrangement, particle chip forming device and a collector for removing the frozen particles or chips to a storage area;

FIGURE 2 is an end elevational view taken along the line 2—2 of FIGURE 1 looking in the direction of the arrows showing the machinery, mechanism, equipment and apparatus of the system in a first operating position for forming the frozen product in solid lines and illustrating in dotted lines the component parts of the system being hingeably or pivotably moved to a second position wherein the drive connection, liquid sealing mechanism, conveyor arrangement, and particle chipper device may be readily and easily accessible and removable from the freezing equipment of the system with the direction of the removal thereof being shown by the solid arrow;

FIGURE 3 is an enlarged partial sectional view of the drive machinery and the drive connection as illustrated in FIGURE 1 as well as a modification or embodiment of the liquid sealing mechanism of this invention;

FIGURE 4 is an isometric exploded partial view of the embodiment or modification of the drive connection of this invention as illustrated in FIGURES 1 and 3;

FIGURES 5 through 9 are each exploded perspective views similar to FIGURE 4 but illustrating other modifications or embodiments which the drive connection of this invention may take;

FIGURE 10 is an exploded perspective view of the apparatus showing the preferred embodiment of the drive connection as well as the conveyor arrangement and particle chipper forming device as a unitary structure with the collector secured thereto;

FIGURE 11 is an enlarged partial sectional view of a modification or embodiment which the conveyor arrangement of this invention may take and illustrating the modified form of the conveyor arrangement as being disposed within the freezing equipment of the system;

FIGURE 12 is an exploded view of the particle chipper forming device and collector previously illustrated in FIGURES 1 and 10 of the drawing;

FIGURE 13 is a plan view better illustrating the particle chipper forming device and collector as taken along the line 13—13 of FIGURE 1 looking in the direction of the arrows;

FIGURE 14 is a side elevational partial view of the particle chipper device and the collector as taken along the line 14—14 of FIGURE 13 looking in the direction of the arrows;

FIGURE 15 is a plan view of the particle chipper forming device and collector as taken along the line 15—15 of FIGURE 1 looking in the direction of the arrows;

FIGURE 16 is a plan view similar to FIGURE 13 of the drawing but illustrating a modification or embodiment which the collector may take, and FIGURE 17 is a sectional view taken along the line 17—17 of FIGURE 16 looking in the direction of the arrows.

Figure 2:
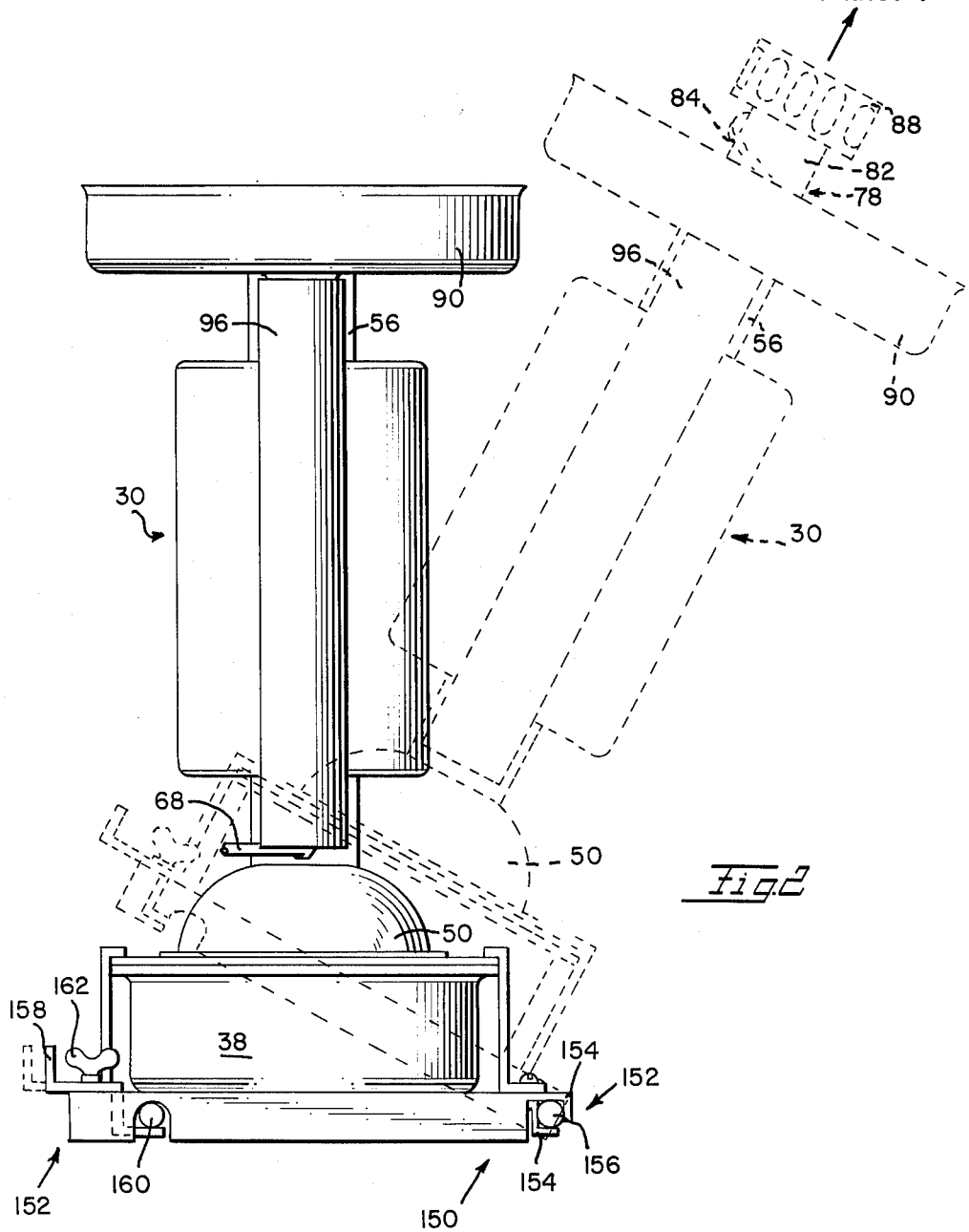

Attention is now directed to FIGURES 1 and 2 of the drawing wherein there is shown a system which employs a method or process for forming particles or chips 20 of a frozen food product from a liquid source or supply 22 with the system being provided with various component parts, such as drive machinery 24, drive connection 26, sealing mechanism 28, freezing equipment 30, conveying apparatus 32 and a collector 34 for removing the frozen particles or chips 20 to a storage area, not illustrated.

The drive machinery 24 comprises driving means 36, such as an electric motor or the like, to which a supporting gear transmission housing 38 is suitably secured, supported or attached. A relatively short, vertically extending drive shaft 40 is rotatably mounted or journaled in vertically spaced apart, upper and lower anti-friction bearing means 42, of any suitable type which are located within the housing 38. Conventional type sealing means 44 is mounted in the support for the upper bearing means 42 and a drip shield 46 is secured to the drive shaft 40 adjacent the support for the upper bearing means 42 for directing any drippings of the liquid which may flow past the sealing mechanism 28 away from the upper bearing means 42 into a chamber 48 defined by an enclosure 50 which is disposed in surrounding relationship relative to the drip shield 46 with the enclosure 50 being mounted on and secured to the transmission housing 38 in co-axial relationship to the drive shaft 40.

A gear train having drive gearing 52 powered from the driving means 36 and driven gearing 54 fixed to the drive shaft 40 for rotation therewith, is provided within the confines of the housing 38 for rotating the conveying apparatus 32, through the drive connection 26, as will be described and disclosed in more detail hereinafter.

The freezer equipment 30 comprises a relatively long, elongate, substantially rigid, open-ended freezer cylinder or tubular column 56 which is provided with a substantially open and unobstructed passage which extends throughout generally the entire longitudinal extent thereof and the column 56 is fixedly secured to the upper end portion of the enclosure 50 and coaxially disposed to the drive shaft 40 and a substantially cylindrical helical freezing coil 58, preferably formed of steel or copper for example, and embedded in a tubular freezer 60, which may be formed for example of aluminum, and mounted in contacting surrounding relationship to the freezer column 56 with the tubular freezer 60 being enclosed in an insulating jacket 62. It is not intended that the specific structural details of the freezing equipment 30 form a part of the instant invention and it is to be understood that the freezing coil 58 is connected to conventional type refrigerating means, not illustrated, which is of adequate design to provide for the flow of a freezing refrigerant therethrough.

Within the passage and adjacent the lower extremities of the freezer column 56 there is disposed the fluid or liquid sealing mechanism 28 which comprises suitable packing 64, vulcanized or otherwise secured to the interior wall of the freezer column 56, and a ring 66 snugly positioned in rotary contact with the packing 64 and fixedly secured adjacent the upper end portion of the drive shaft 40 for rotation therewith.

The sealing mechanism 28, in the embodiment or modification of the invention as illustrated in FIGURE 1 of the drawing has the packing 64 and the ring 66 disposed below the drive connection 26 while in FIGURE 3 of the drawing it is to be noted that the sealing mechanism 28 may be disposed within the confines of the freezer column 56, as defined by the passage therein, but above the drive connection 26.

Conduit means 68 is provided for placing the liquid source 22 in communication with the passage of the freezer column 56 at a location which is substantially immediately above the sealing mechanism 28, through an aperture 70 at the lower end thereof with the upper end of the conduit means 68 being connected to an opening in a float valving 72 controlled reservoir or tank 74 which in turn receives the liquid through a supply conduit means 76 for supplying the reservoir or tank 74 with a quantity of the liquid food product. The position or location of the reservoir or tank 74 and the control effected by the float valving 72 is of substantially conventional type construction which is suitable to maintain a liquid level L within the reservoir or tank 74 at a location below the top portion of the freezing equipment 30.

The conveying apparatus 32 comprises a generally vertically disposed elongate rotatably mounted conveyor arrangement 78 having secured thereto for rotation therewith in a unitary manner either as a separate or integral part, a chipper-particle forming device 80.

The conveyor arrangement 78, as illustrated in FIGURES 1 and 10 of the drawing, is in the form of an auger having a shaft portion 82 and a helical threaded portion 84 which is provided with a constant root diameter throughout the full longitudinal extent thereof to define a substantially cylindrical surface 86, while in FIGURE 11 of the drawing, there is illustrated a modification or embodiment of the conveyor arrangement 78 wherein the helical threaded portion 84 thereof is provided with a root diameter that tapers upwardly and outwardly so that a substantially concial surface 86 is provided on the shaft portion 82 that is inclined or diverges in a manner that will compress the liquid as it is frozen against the inner wall of the freezer column 56 to effectively squeeze the liquid from the solid frozen product. The inclined or diverging surface 86 of the conveyor arrangement 78 as illustrated in FIGURE 11 of the drawing possesses an increased compressive force by reason of the fact that the diameter of the shaft portion 82 is not constant while in FIGURES 1 and 10 the surface 86 which has a constant diameter will possess sufficient compressive force to separate unfrozen liquid from the frozen solid product.

In the embodiments or modifications of the apparatus 32, the conveyor arrangement 78, in each instance, is disposed within the confines defined by the passage through the freezer column 56 with the upper end portion thereof projecting outwardly therefrom to which there is either exteriorly formed therewith or removably securely attached thereto the chipper-particle forming device 80 which may have attached thereto a sweep arm-like member 88 of the collector 34 which is disposed within a circular, relatively shallow collection tray-like element 90 which is secured to the outer surface of the upper portion of the freezer column 56. The tray-like element 90 may be provided with a removable cover 92 and a discharge opening 94 in the radially outer portion from which there depends and extends in a generally downwardly and substantially outwardly projecting relationship an elongate tube or chute 96 which may lead to a storage area, not illustrated, whereat the frozen product may be placed for use by a consumer.

The tray-like element 90 of the collector 34 is also provided with an opening 98 which is centrally located and which is substantially open and obstructed through which the frozen product may pass from within the confines defined by the passage of the freezer column 56 through the action of the conveyor arrangement 78 and it is to be noted that the helical threaded portion 84 of the conveyor arrangement 78 will effect, on rotation thereof in a counterclockwise direction, a force against the frozen food product within the column 56 which will urge the frozen food product upwardly and through the opening 98 in the collector 34 and cause the conveyor arrangement 78 to bear downwardly against the drive shaft 40 and maintain the drive connection 26 in operation.

In the modification or embodiment of the invention as illustrated in FIGURE 1 of the drawing, the other or lower end portion of the conveyor arrangement 78 terminates within the confines defined by the passage of the freezer column 56 above the sealing mechanism 28 with the conveyor arrangement 78 defining a portion of the drive connection 26 while in the modification or embodiment, as illustrated in FIGURE 3, the conveyor arrangement 78 projects beyond the confines of the passage in the freezing column 56 and terminates below the sealing mechanism 28 with the conveyor arrangement 78 being provided with a reduced portion 100.

In each modification or embodiment of the drive connection 26, as illusrtated in FIGURES 1 and 10, 3, 4, 5, 6, 7, 8 and 9, respectively, there is provided a coupling assembly 102 which comprises mating portions 104 and 106 carried by the upper end portion of the drive shaft 40 and the lower end portion of the conveyor arrangement 78, respectively.

The coupling assembly 102 and the mating portions 104 and 106 may take many forms and configurations which in each instance will enable the conveyor arrangement 78 to be drivingly connected to, powered, actuated or rotatably operated by the drive shaft 40 yet easily and readily removable and accessible in accordance with and in compliance to the requirements as formulated by the standards set forth by the National Sanitation Foundation.

In FIGURES 1 and 10, the coupling assembly 102 has the mating portion 104 thereof in the form of a reduced portion on the drive shaft 40 which projects therefrom and is telescopically received within the mating portion 106 which is in the form of an axially extending recess on the conveyor arrangement 78 and a laterally extending elongate relatively rigid item 108, preferably in the form of a cross-pin or the like, may further be provided which is received in the laterally extending complementary disposed notches or channels 110 formed in the conveyor arrangement 78.

In FIGURES 3 and 4 of the drawing, the drive connection 26 is not provided with the complementary mating portions 104 and 106, each of which have been eliminated, and in this instance the drive connection 26 relies on the item 108 and the notches or channels 110 for defining and establishing the drive connection between the drive shaft 40 and the conveyor arrangement 78.

In FIGURE 3, there is illustrated a centering sleeve 112 which is carried by the drive shaft 40 above the drip shield 46 for centering the conveyor arrangement 78 during the removal and reassembly thereof, as required and desired.

In FIGURE 5, the notch or channel 110 of the drive connection 26 takes the form of a slot or groove 114 which is provided on the mating portion 104 of the drive shaft 40 which is also in the configuration or form of a frustrum of a cone, and a bore or aperture 116 in communication with the complementary mating portion 106 is provided on the conveyor arrangement 78 through which the item 108 may be passed to engagement with the slot or groove 114.

In FIGURES 6 through 9 of the drawing, there are illustrated different configurations or forms which the complementary mating portions 104 and 106 of the drive conection 26 may take wherein, in FIGURE 6, the mating portion 104 of the drive shaft 40 is formed as a bevelled tongue which drivingly engages the complementary mating portion 106 in the end portion of the conveyor arrangement 78; in FIGURE 7, the mating portion 104 of the drive shaft 40 is in the form of a lug having substantially rectangular sides with the mating portion 106 being correspondingly shaped; in FIGURE 8, the mating portion 104 is in the form of a driving prism having a triangular configuration in section carried on the end portion of the drive shaft 40 for drivingly engaging the complementary shaped mating portion 106 of the conveyor arrangement 78, and in FIGURE 9, the mating portion 104 is a driving prism having a hexagonal configuration in cross-section with the mating portion 106 having a complementary configuration.

While in each of the embodiments or modifications of the coupling assembly 102 the mating portion 104 is formed on the drive shaft 40 with the mating portion 106 being complementary thereto and formed on the conveyor element 78, it is to be understood that the mating portions 104, 106 as well as the item 108, the notches or channels 110, the slot or groove 114, etc., it is obvious that the relative disposition of these parts and structural features of the coupling assembly 102 may be reversed, if desired, and still enable the component parts of the system to be readily and easily accessible and removable.

In each of the embodiments or modifications of the coupling assembly 102 of the drive connection 26, the end portion of the drive shaft 40 has a substantially flat portion 118 from which the mating portion 104 projects or in which the notches or channels 110 may be formed which defines an end thrust bearing surface against which a similar substantially flat portion 120 on the conveyor arrangement 78 may bear.

Also, the item 108, when engaged and held in the notches or channels 110 or the slot or groove 114 by the force of gravity acting on the conveyor arrangement 78, together with any force created by the rotation thereof, not only functions as a vertical support and drive coupling or connection for enabling the conveyor arrangement 78 to be powered, driven, actuated or rotated by the drive machinery 24 through the drive shaft 40 but also functions as a shear pin type environment to protect the gear train from damage.

The conveyor arrangement 78 is disposed within the confines defined by the passage through the freezer column 56 in spaced relationship thereto and defines therewith a clearance 122 between the extremities of the threaded portion 84 of the conveyor arrangement 78 and the inner surface of the freezer column, such clearance being preferably of at least .020 inch in size so that the conveyor arrangement 78 may be disposed with a floating effect, in a manner which will be described and disclosed hereinafter, within the confines of the passage in the freezer column 56.

The particle-chip forming device 80 is secured to the upper end portion of the conveyor arrangement 78, which, as illustrated in FIGURE 14 of the drawing, comprises a reduced externally threaded portion 124 which is received within an internally threaded bore 126. It is to be understood that the particle-chip forming device 80 may be secured to the conveyor arrangement 78 by other conventional means such as keyed, set screw or the like, as well as having the device 80 formed integral with the shaft portion 82 of the conveyor arrangement 78, as illustrated in FIGURE 10 of the drawing.

The particle-chip forming device 80 comprises a chip breaker and sizing head portion 128 which has a substantially disk-like generally cylindrical body 130 of a diameter slightly greater than the corresponding diameter of the freezer column 56 with the body 130 having a vertical depth slightly less than that of the collection tray-like element 90 with the lower surface 132 of the body 130 being positioned slightly above in spaced relationship to the bottom surface of the tray-like element 90.

Extending substantially continuously around the lower peripheral side edge portion of the body 130 there is provide an annular substantially endless concave frozen product deflector surface 134 which terminates in the bottom 132 and side 136 surface portions of the body 130 with the intersection of the deflector surface 134 and the bottom surface 132 of the body 130 being substantially in axial alignment with the surface 86 of the shaft portion 82 of the conveyor arrangement 78.

While the radius of curvature of the deflector surface 134 may be varied with limits defined by the desires of an operator, such radius of curvature should be sufficiently large enough so that the intersection of the bottom surface 132 of the body 130 with the deflector surface 134 will be at a location which is not generally outwardly offset beyond a continuation of the substantially cylindrical surface 86 of the shaft portion 82 of the conveyor arrangement 78.

The sizing head portion 128 may also be provided with a series of breaker pins 138 which are disposed thereon at circumferentially spaced locations adjacent to the outer peripheral side surface 136 of the body 130 with the pins 138 projecting into the cavity defined by the concave deflector surface 134 whereat the pins terminate with the diameter measured from diametrically opposed pins being greater than the diameter defined by the surface created by the threaded portion 84 of the conveyor arrangement 82, as well as the diameter of the freezer column 56. The breaker pins 138 have the upper end portions thereof flush with the top surface 140 of the body 130 and, as illustrated, the series of breaker pins 138 are substantially equally disposed along space intervals around the body 130. However, it is to be understood that the breaker pins 138 may be secured to the body 130 at unequal space intervals and are removable and insertable into the body 130 so that the operator may vary, as desired or required, the size of the particles or chips 20 which are created by the device 80.

If desired, a relatively thin substantially circular cover plate 137 may be secured to the upper surface of the body 130, as illustrated in FIGURE 1, to provide suitable covering for the parts when in assembled relationship relative to each other.

Secured by suitable means 142, such as screws or the like, to the side surface 136 of the body 130, for rotation therewith, in a generally wrapped-around relationship relative thereto is the sweep arm-like member 88 having a vertical or upstanding depth which corresponds to and is substantially equal to the depth of the tray-like element 90 with the member 88 closing a portion of the annular cavity defined by the deflector surface 134 at the area of circumferential extent which is adjacent the securement of the member 88 to the body 130. Throughout the area of extent whereat the member 88 is secured to the body 130, the member 88 is provided with a series of apertures 144 through which the particles or chips 20 of the frozen product pass for engagement by the member 88 to urge the particles or chips 20 to be fed to the discharge opening 94 in the bottom of the tray-like element 90.

The area of extent along which the member 88 is secured to the body 130 places the member 88 in engagement with the body 130 for approximately 270° of the circumference of the body 130, note FIGURES 13 and 15 of the drawing, with the member 88 then extending substantially tangentially from the body 130 in a gentle, generally slightly arcuate sweep toward the perpiheral extremity of the tray-like element 90 whereat the member 88 terminates in close proximity thereto.

In FIGURES 16 and 17 of the drawing, there is illustrated an embodiment or modification of the sweep arm-like member 88 which comprises an elongate substantially straight member 146 which is secured to the body 130 by the securing means 142 for rotation therewith. The elongate member 146 projects generally radially from the body 130 in a direction which may be considered as away from the direction which the body 130 of the particle-chipper forming device 80 and the conveyor arrangement 78 may be rotating, and terminates in close proximity to the peripheral extent of the tray-like element 90. The elongate member 146 has an edge portion 148 thereof which projects forwardly in the direction of rotation and engages the bottom of the tray-like element 90, in a manner which is clearly illustrated in FIGURE 17 of the drawing.

In order to further enable the component parts of the system, such as the conveyor apparatus 32, the collector 34, the particle-chipper forming device 80, as well as other parts which have been described and disclosed above, to be readily and easily accessible and removable, the system may be mounted on a support 150 by structure 152 which enables the component parts of the system to be pivoted to a position whereat such parts are readily and easily accessible and removable in accordance with the standards formulated by the National Sanitation Foundation.

As illustrated in FIGURE 2 of the drawing, the structure 152 is carried by the housing 38 and comprises bracket-like parts 154 which engage opposed sides of an elongate part 156 of the support 150 and a releasable latching attachment 158 which releasably engages another part 160 of the support 150. Releasing means 162 in the form of a winged nut releasably secures the latching attachment 158 to the other part 160 of the support 150 and in dotted lines, in FIGURE 2 of the drawing, the component parts of the system, as well as the parts of the support 150 and the structure 152, are shown in pivoted position for enabling an operator to have ready and easy access thereto for the removal thereof in the direction of the arrow, while these parts are shown in solid lines in a position wherein the system is operable.

The operation of the system which employs the novel method or process of providing a frozen food product which is in the form of the particles or chips 20 will now be described. The liquid which is to be frozen, may be either plain, flavored or colored and of any suitable substance, such as water, fruit juices or the like, and the liquid continuously flows via the conduit means 76 into the reservoir or tank 74 and thence through the conduit means 68 into the lower end portion of the freezing column 56 by way of the inlet aperture 70 with the liquid seeking the level L in the passage defined by the freezing column 56, and the liquid level L is automatically controlled by reason of the float valving 72 which is effective to maintain the liquid level L within the reservoir or tank 74. Due to the freezing equipment 30, the liquid in the freezer column 56 is progressively frozen therein from the lower end portion thereof toward the top portion, with the conveyor arrangement 78 being rotated at a predetermined speed so that the frozen food product is progressively urged upwardly as it is being frozen.

As the liquid food product is being frozen within the confines of the freezer column 56, the frozen product takes solid form and adheres to and extends generally radially inwardly or laterally toward the conveyor arrangement 78 from the inner surface of the freezer column 56 to and around the helical threaded portion 84 and against the surface 86 of the shaft portion 82, and thus there is defined by reason of the substantially solid frozen product, bearing surfaces which are effective in creating both lateral and longitudinal forces acting on the rotating conveyor arrangement 78. By reason of the fact that there is a definite controlled clearance 122 of at least .020 inch between the outer extremities of the helical threaded portion 84 and the freezer column 56, the conveyor arrangement 78 is disposed with a floating effect so that the lateral and vertical bearing surfaces are created since on rotation of the conveyor arrangement 78 the helical threaded portion 84 will shear or cut through the frozen product and leave a film, layer or column of frozen product which will correspond in size to the size of the clearance 122, with a sheared off helical ribbon of frozen product being formed which is forced and urged upwardly through the opening 98 in the tray-like element 90 of the collector 34.

By reason of the adhesion of the column of frozen product which occupies the space defined by the clearance 122 wherein such adhesion may either be to the rotating conveyor arrangement 78 or the inner surface of the freezer column 56 or both, there is created the bearing surfaces against which the conveyor arrangement 78 is actuated. It is to be noted that in the system of this invention, it is the frozen product which defines the bearing surfaces for the rotating conveyor arrangement 78, and the column of frozen product that is disposed in the clearance 122 acts as the rotary or longitudinal bearing surface, as well as the lateral bearing surface for positioning the conveyor arrangement 78 in disposing the conveyor arrangement 78 with the floating effect within the confines of the passage through the freezer column 56.

Since the conveyor arrangement 78 is continuously rotating and thus cutting or shearing the frozen product to define and create the column thereof in the clearance 122, while simultaneously continuously lifting or urging the sheared or cut helical ribbon thereof upwardly in the particle-chipper forming device 80, there is exerted a generally downwardly directed force that causes the coupling assembly 102 of the drive connection 26 to be maintained in operative relationship.

In passing, it is believed to be of interest to note that the size of the clearance 122 may be varied depending upon the desired thickness of the column of frozen product which is disposed therein, which in actual practice in forming ice particles or chips, has been found desirable to have the clearance to be of approximately .020 inch. However, depending on the size and configuration of the conveyor arrangement 78, the type of liquid being frozen and the desired size of the finished particles or chips of frozen product, it is possible that other thicknesses may be desirable. The critical aspect of the size of the clearance 122 is that this clearance must be sufficiently large enough to enable a column of frozen product to be maintained therein with the conveyor arrangement 78 having a floating effect so as to create bearing surfaces for the rotating conveyor arrangement 78 which thus enables the system to not require any additional conventional type bearing structure to be provided, since such bearing structure will hinder the accessibility and removability of the component parts of the system and accordingly, not enable the system to comply with the standards formulated by the National Sanitation Foundation.

As the ribbon of frozen product is forced or urged upwardly by the rotating conveyor arrangement 78 through the opening 98 in the tray-like element 90, the ribbon of frozen product is brought into contact with the annular concave deflector surface 134 formed on the body 130 of the particle-chipper forming device 80. The annular concave deflector surface 134 deflects the ribbon of frozen product generally radially outwardly and forces or urges the frozen product into contact with the rotating breaker pins 138 which effectively break up the frozen product into the particles or chips 20 in conformity with the circumferential spacing of the breaker pins 138 about the body 130 of the particle-chip forming device 80. Obviously, by substituting breaker pins of different sizes or by varying the circumferential spacing thereof about the body 130, it is possible to obtain particles or chips of the frozen food product which will vary in size. Similarly, as briefly mentioned above, it is also possible to vary the thickness of the ribbon of frozen product according to different sized conveyor arrangements having the shaft and helical threaded portions thereof varying according to the desired resulting size of the final form of the frozen product.

As the frozen product is formed into the particles or chips 20 by the action of the device 80, the particles or chips 20 pass into the tray-like element 90 whereat they are engaged by the rotating member 88 or 146 which pass the particles or chips 20 to the discharge opening 94 in the tray-like element 90 whereat the particles or chips 20 pass through the elongate tube or chute 96 to the storage area. It should be noted that the members 88 and 146 are each disposed relative to the rotating body 130 of the particle-chip forming device 80 in a manner which causes the members 88 or 146 to each urge the particles or chips 20 generally radially outwardly and effectively deflect the particles or chips 20 toward the discharge opening 94 in the tray-like element 90.

From the foregoing disclosure and description, it is believed to be apparent that the system of forming particles or chips of a frozen product wherein the novel method or process of this invention is employed through the operation of the improved component parts thereof, that such method or process is one which is continuous and capable of forming frozen product chips or particles of varying size from suitable liquids with the component parts of the system complying with the proposed standards of cleanliness as formulated by the National Sanitation Foundation.

In order to readily and easily disassemble, reassemble, remove and have the various component parts of the system otherwise accessible, primarily for the purpose of cleaning the component parts of the system by hand without requiring the aid of any tools, it is merely necessary to shut down the system which controls the freezing equipment 30 and allow the liquid within the freezer column 56 to return to its liquid form as it originally existed, release the latching attachment 158 and pivot the component parts of the system from the solid line position to the dotted line position, as illustrated in FIGURE 2 of the drawing, about the pivot defined by the bracket-like parts 154 and the part 156 of the support 50, and with the cover 92 of the tray-like element 90 of the collector 34 removed, it is possible to manually grip the particle-chip forming device 80 which is secured to the conveyor arrangement 78 and lift the apparatus 32, in the direction of the arrow in the dotted line position of FIGURE 2, from the confines defined by the passage in the freezer column 56 of the freezing equipment 30, since the coupling assembly 102 of the drive connection 26 is readily and easily uncoupled as a result of movement in this direction. Since the frozen product within the confines of the freezer column 56 has returned to its initial liquid state, the bearing surfaces created by the column of frozen product no longer exists, and the apparatus 32 is readily and easily accessible and removable from the system. Further, with the apparatus 32 removed, the upwardly projecting mating portion 104 of the coupling assembly, as well as the product essence of the freezer column 56 of the freezing equipment 30, are easily and readily accessible for thorough cleaning, for example by scalding, and the tray-like element 90, discharge tube or chute 96, as well as the members 88 or 146, together with the body 130 and the breaker pins 138, as well as the other component parts which define the drive connection 26, the sealing mechanism 28, the apparatus 32, the collector 34, the particle-chip forming device 80, etc., may be easily, readily and thoroughly cleaned for sanitary purposes.

While the invention has been described and disclosed in terms of several embodiments or modifications which it has assumed in actual practice, the scope of the invention should not be deemed to be limited by the precise embodiments or modifications as herein shown, illustrated, described and disclosed, and it is to be understood that still other such embodiments or modifications are intended to be reserved, especially as they fall within the scope of the claims herein subjoined.

What we claim as our invention is:

1. A system for preparing a frozen product comprising
an elongate column having a substantially open and unobstructed passage therethrough for receiving a liquid which may be frozen therein and
freezing equipment for freezing such liquid in the passage of the column,
an elongate conveyor arrangement disposed within the passage of the column in spaced relationship relative thereto and defining therewith a clearance therebetween,
machinery for rotating said conveyor arrangement relative to the column,
said conveyor arrangement having a portion thereof which is effective for engaging liquid which is being frozen into such product in the passage of the column to create a bearing surface therewith which enables the conveyor arrangement to have a floating effect relative to the column,
a drive connection between the machinery and the conveyor arrangement,
a device carried by the conveyor arrangement for rotation therewith to form such frozen product into particles of chip-like size, and
a collector for receiving such particles of frozen product when formed into chip-like size and for removing such product from the machine to a storage area.

2. A system for preparing a frozen product comprising
an elongate column having a substantially open and unobstructed passage therethrough for receiving a liquid which may be frozen therein and
freezing equipment for freezing such liquid in the passage of the column,
an elongate conveyor arrangement disposed within the passage of the column in spaced relationship relative thereto and defining therewith a clearance therebetween,
machinery for rotating said conveyor arrangement relative to the column to remove one portion of such frozen product from the passage in the column while allowing another portion thereof to remain within the space defined by the clearance between the conveyor arrangement and the column with the another portion of such frozen product creating bearing means to enable the conveyor arrangement to have a floating effect within the passage of the column during the rotation thereof,
a drive connection between the machinery and the conveyor arrangement,
means for forming the one portion of such frozen product into particles, and
means for transferring the particles of the one portion of such frozen product to a storage area.

3. A machine for forming a frozen product into particles of chip-like size from a liquid, said machine comprising
a column having a passage therethrough for receiving such liquid therein,
freezing equipment for freezing such liquid into a frozen product in the passage of the column,
a conveyor arrangement disposed within the passage of the column for rotation relative thereto with said conveyor arrangement being in spaced relationship to the column and defining therewith a clearance therebetween,
machinery for rotating said conveyor arrangement relative to the column to remove one portion of such frozen product from the passage in the column while allowing another portion thereof to remain within the space defined by the clearance between the conveyor arrangement and the column with the another portion of such frozen product creating bearing means to enable the conveyor arrangement to have a floating effect within the passage of the column during the rotation thereof, and
means for forming the one portion of such frozen product into particles of chip-like size.

4. An arrangement for conveying material through a passage in a column, said arrangement comprising a shaft-like member having an externally threaded portion thereon which extends substantially throughout the longitudinal extent thereof,
said shaft-like member being disposed within the confines of the passage in the column with the threaded portion being disposed in spaced relationship relative thereto and defining therewith a clearance therebetween,
machinery for rotating the shaft-like member relative to the column to remove one portion of such material from the passage in the column while allowing another portion thereof to remain within the space defined by the clearance between the threaded portion of the shaft-like member and the column with the another portion of such material engaging the threaded portion of the shaft-like member to create bearing means for enabling the shaft-like member to have a floating effect within the passage of the column during the rotation thereof, a driving connection between the machinery and the shaft-like member, a device carried by the shaft-like member for rotation therewith to form the one portion of such material into particles of chip-like size, and means for removing such particles from the arrangement.

5. An arrangement for conveying material through a passage in a column, said arrangement comprising a shaft-like member having an externally threaded portion thereon which extends substantially throughout the longitudinally throughout the longitudinal extent thereof, said shaft-like member being disposed within the confines of the passage in the elongate column with the threaded portion being disposed in spaced relationship relative thereto and defining therewith a clearance therebetween, machinery for rotating the shaft-like member relative to the column to remove one portion of such material from the passage in the column while allowing another portion thereof to remain within the space defined by the clearance between the threaded portion of the shaft-like member and the column with the another portion of such material engaging the threaded portion of the shaft-like member to create bearing means for enabling the shaft-like member to have a floating effect within the passage of the column during the rotation thereof, a driving connection between the machinery and the shaft-like member, and means for forming the one portion of such material into particles.

6. The arrangement as set forth in claim 5 wherein the threaded portion of the shaft-like member has a root diameter that is substantially constant throughout the longitudinal extent thereof.

7. The arrangement as set forth in claim 5 wherein the threaded portion of the shaft-like member has a root diameter that varies throughout the longtiudinal extent thereof.

8. A machine for preparing a frozen product from a liquid, said machine comprising freezing equipment having a passage therethrough wherein such liquid may be frozen, a conveyor arrangement disposed within the confines defined by the passage of the freezing equipment in spaced relationship thereto and defining therewith a clearance therebetween, machinery for rotating said conveyor arrangement relative to the freezing equipment to remove one portion of such frozen product from the passage in the freezing equipment while allowing another portion thereof to remain within the space defined by the clearance between the conveyor arrangement and the freezing equipment with the another portion of such frozen product creating bearing means to enable the conveyor arrangement to have a floating effect within the passage of the freezing equipment during the rotation thereof, a drive connection between the machinery and the conveyor arrangement, said drive connection comprising a coupling assembly having a plurality of parts at least one of which is carried by the machinery with at least one other of the parts being carried by the conveyor arrangement, said parts having configurations which dispose the parts in separable relationship relative to each other for enabling the conveyor arrangement to be easily and readily accessible and removable from the machine, a device carried by the conveyor arrangement for rotation therewith to form the one portion of such frozen product into particles of chip-like size, and a collector for receiving and for removing such frozen chip-like product from the machine to a storage area.

9. A system for preparing a frozen product in chip-like size from a liquid, said system comprising freezing equipment having a passage therethrough wherein such liquid may be frozen, a conveyor arrangement for removing such frozen liquid from within the passage of the freezing equipment, machinery for rotating said conveyor arrangement relative to the freezing equipment to remove one portion of such frozen product from the passage in the freezing equipment while allowing another portion thereof to remain within the space defined by the clearance between the conveyor arrangement and the freezing equipment with the another portion of such frozen product creating bearing means to enable the conveyor arrangement to have a floating effect within the passage of the freezing equipment during the rotation thereof, a drive connection between the machinery and the conveyor arrangement, a device for forming such frozen liquid into a product of chip-like size, said device comprising a sizing head carried by the conveyor arrangement for movement therewith, said sizing head having an edge portion thereof reduced to define an annular generally arcuate surface that creates a substantially open and unobstructed cavity wherein such frozen product may be received for sizing into particles of chip-like size, and means for receiving and transferring such particles of chip-like frozen product to a storage area.

10. A machine for preparing a frozen product, said machine having a plurality of component parts, said parts comprising a housing, freezing equipment supported by said housing for freezing a liquid into such frozen product, said freezing equipment having a column provided with a passage therethrough for receiving such liquid, apparatus for removing such frozen product from the freezing equipment to a storage area, said apparatus comprising a conveyor arrangement disposed within the passage in the column of the freezing equipment for rotation relative thereto, machinery supported by the housing for rotating the conveyor arrangement of the apparatus, a support for the housing, and structure pivotally mounting the housing to the support to enable the component parts of the machine to be disposed in a first position wherein the machine is operable to form such frozen product and a second position whereat the apparatus is accessible and removable from the freezing equipment and the machinery of the machine.

11. The machine as set forth in claim 10 wherein said structure comprises a releasable latching attachment which secures the component parts of the machine in the first position.

12. The machine as set forth in claim 10 wherein said structure comprises a relatively stationary part on the support, and bracket parts carried by the housing which frictionally engage the elongate part of the support.

13. A machine for forming a frozen product into particles of chip-like size from a liquid, said machine comprising a column having a passage therethrough for receiving such liquid therein, freezing equipment for freezing such liquid into a frozen product in the passage of the column, a conveyor arrangement disposed within the passage of the column for rotation relative thereto with said conveyor arrangement being in spaced relationship to the column and defining therewith a clearance therebetween, machinery for rotating said conveyor arrangement relative to the column to remove one portion of such frozen product from the passage in the column while allowing another portion thereof to remain within the space defined by the clearance between the conveyor arrangement and the column with the another portion of such frozen product creating bearing means to enable the conveyor arrangement to have a floating effect within the passage of the column during the rotation thereof, a drive connection between the machinery and the conveyor arrangement, a device carried by the conveyor arrangement for rotation therewith to form the one portion of such frozen product into particles of chip-like size, and a collector for receiving such particles of frozen product when formed into chip-like size and for removing such product from the machine to a storage area.

14. The machine as set forth in claim 13 wherein said device is in spaced relationship to all other component parts of the machine other than the conveyor arrangement.

15. The machine as set forth in claim 13 wherein said device is integral with the conveyor arrangement.

16. The machine as set forth in claim 13 wherein said device is removably secured to the conveyor arrangement.

17. The machine as set forth in claim 13 wherein said collector comprises an elongate member secured to the device and said member projects generally radially outwardly therefrom.

18. The machine as set forth in claim 17 wherein said member depends from the device and terminates adjacent a cavity formed therein whereat said member is provided with at least one aperture for enabling such frozen product which has been formed to chip-like size to pass therethrough and be urged to the storage area.

19. The machine as set forth in claim 17 wherein said member extends about a portion of said device and then projects therefrom and terminates in an arcuate portion.

20. The machine as set forth in claim 17 wherein said member is secured to an upper portion of the device and is substantially straight and provided with an edge portion which projects forwardly relative to the movement of the device.

References Cited by the Examiner

UNITED STATES PATENTS

| | | | |
|---|---|---|---|
| 2,135,325 | 11/1938 | Burt. | |
| 2,282,662 | 5/1942 | Lindsey | 62—354 X |
| 2,355,091 | 8/1944 | McDonald | 100—145 X |
| 2,415,585 | 2/1947 | Genova | 62—354 X |
| 2,701,518 | 2/1955 | McDonald | 100—193 |
| 2,753,694 | 7/1956 | Trow | 62—354 X |
| 2,850,268 | 9/1958 | Miller | 62—342 X |
| 2,877,632 | 3/1959 | Chaplik | 62—320 |
| 2,905,398 | 9/1959 | De Angelis | 241—257 |
| 2,962,878 | 12/1960 | Keller | 62—320 |
| 3,002,361 | 10/1961 | Whetstone | 62—354 |
| 3,034,311 | 5/1962 | Nelson | 62—320 |
| 3,051,401 | 8/1962 | Huck | 241—257 |
| 3,059,450 | 10/1962 | Mueller | 62—354 X |
| 3,145,017 | 8/1964 | Thomas | 62—354 X |
| 3,165,904 | 1/1965 | Jones | 62—365 X |

EDWARD J. MICHAEL, *Primary Examiner.*